United States Patent [19]

Matsushita

[11] Patent Number: 5,200,857
[45] Date of Patent: Apr. 6, 1993

[54] COLOR SEPARATION/SYNTHETIC OPTICAL SYSTEM INCLUDING TWO DICHROIC MIRRORS ANGLED FOR CORRECTION OF ASTIGMATISM

[75] Inventor: Hajime Matsushita, Saitama, Japan

[73] Assignee: Pioneer Electronic Corporation, Tokyo, Japan

[21] Appl. No.: 820,548

[22] Filed: Jan. 14, 1992

[30] Foreign Application Priority Data

Jan. 17, 1991 [JP] Japan .................................. 3-3764

[51] Int. Cl.$^5$ .......................... G02B 27/10; G02B 5/28
[52] U.S. Cl. .................................... 359/634; 359/637; 359/583
[58] Field of Search ................ 359/634, 637, 583, 589

[56] References Cited

U.S. PATENT DOCUMENTS 3,794,407  2/1974  Nishimura .......................... 359/634

Primary Examiner—Jon W. Henry
Attorney, Agent, or Firm—Kane, Dalsimer, Sullivan, Kurucz, Levy, Eisele and Richard

[57] ABSTRACT

A color separation/synthetic optical system has a plurality of dichroic mirrors for allowing an incident light to be transmitted therethrough and to be reflected thereon every different rays of color light. A first dichroic mirror and a second dichroic mirror adjacent to the first dichroic mirror are arranged in a manner that they are inclined by predetermined angles, respectively. The second dichroic mirror is rotationally inclined about a vertical axis to a horizontal axis of rotational inclination of the first dichroic mirror. Thus, both astigmatic differences produced in the two mirrors are canceled.

7 Claims, 5 Drawing Sheets

COLOR SEPARATION/SYNTHETIC OPTICAL SYSTEM INCLUDING TWO DICHROIC MIRRORS ANGLED FOR CORRECTION OF ASTIGMATISM

BACKGROUND OF THE INVENTION

This invention relates to a color separation/synthetic optical system using dichroic mirrors used in a liquid crystal projection television, etc., and more particularly to a color separation/synthetic optical system constructed to reduce an astigmatism produced in a light transmitted through dichroic mirrors arranged in an inclined manner.

The color separation optical system for separating a white light into three colors of red, green and blue by using dichroic mirrors and/or a color synthetic optical system for synthesizing rays of light of three colors of red, green and blue by using the same are employed in a liquid crystal projection television, a color television, etc..

Generally, a color separation/synthetic optical system is of a structure such that a plurality of dichroic mirrors for allowing any one of rays of light in respective wavelength bands of red, green and blue to be transmitted therethrough or to be reflected thereon are successively provided in parallel with each other in a manner inclined with respect to an optical axis, and a liquid crystal panel is arranged on the light emitting side of each dichroic mirror. Rays of color light of red, green and blue separated by the respective dichroic mirrors are incident on a liquid crystal panel, and are transmitted through an image portion corresponding to respective rays of color light. Thus, these rays of color light are color-separated. Further, respective rays of color light transmitted through the liquid crystal panel are synthesized at an optical system such as a mirror, etc. provided close to a color separation system. When synthesized respective rays of color light are projected onto a display plane such as a screen, etc., a color projected image is provided.

However, in the separation of respective rays of light by the dichroic mirror, since separation into respective rays of color light of red, green and blue by the reflection/transmission on and through the dichroic mirror is carried out, there would occur an astigmatism with respect to a light in the wavelength band transmitted, disadvantageously failing to provide a distinct projected image.

SUMMARY OF THE INVENTION

This invention has been made in order to solve the above mentioned problems with the prior art, and its object is to provide a color separation/synthetic optical system capable of reducing an astigmatism in a light obliquely transmitted through a dichroic mirror.

To achieve the above mentioned object, in accordance with this invention, there is provided a color separation/synthetic optical system in which a plurality of dichroic mirrors for allowing an incident light to be transmitted therethrough or to be reflected thereon every different rays of color light are provided in succession on a center axis of the transmitted bundle of light to separate a white light into respective rays of color light of red, green and blue by the plurality of dichroic mirrors, and to synthesize respective rays of color light of red, green and blue into a predetermined color light, wherein the system has at least two first and second dichroic mirrors which are disposed, adjacent to each other, on a light incident side of the optical center axis, the first dichroic mirror being arranged within a plane including a first axis vertical to the optical center axis and inclined by a predetermined angle with respect to the optical center axis, the second dichroic mirror being arranged within a plane including a second axis vertical to both of the optical center axis and the first axis and inclined by a predetermined angle with respect to the optical center axis.

DESCRIPTION OF THE PREFERRED EMBODIMENT

Prior to explanation of this invention, a conventional color separation/synthetic optical system which forms background art will be first described with reference to FIGS. 1 to 4.

Figure 1:
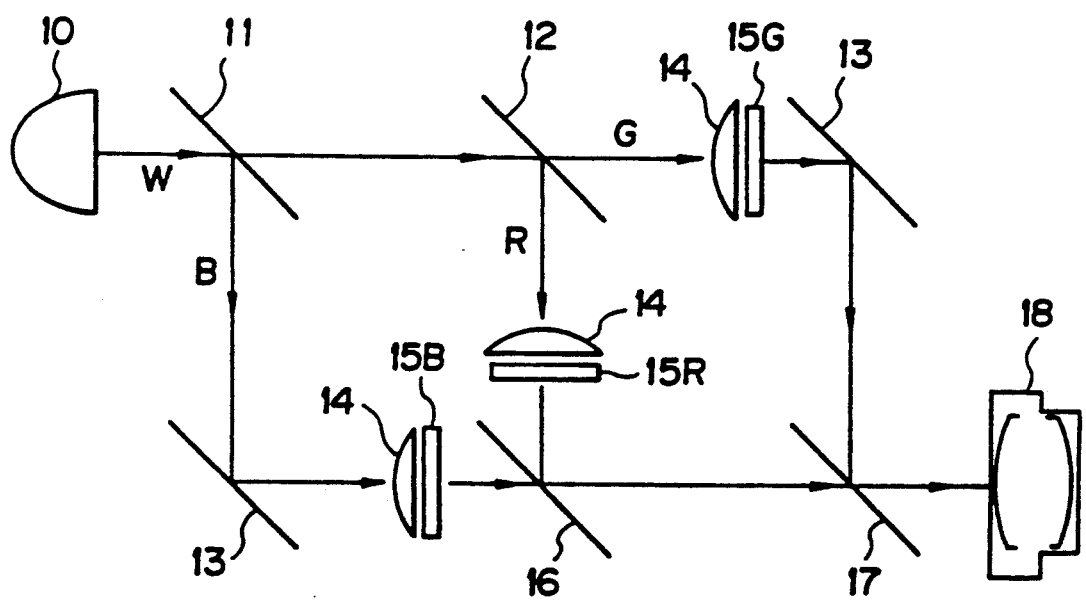
FIG. 1 is a diagram schematically showing the configuration of an example where a conventional color separation/synthetic optical system is applied to a liquid crystal projection television.
Figure 2:
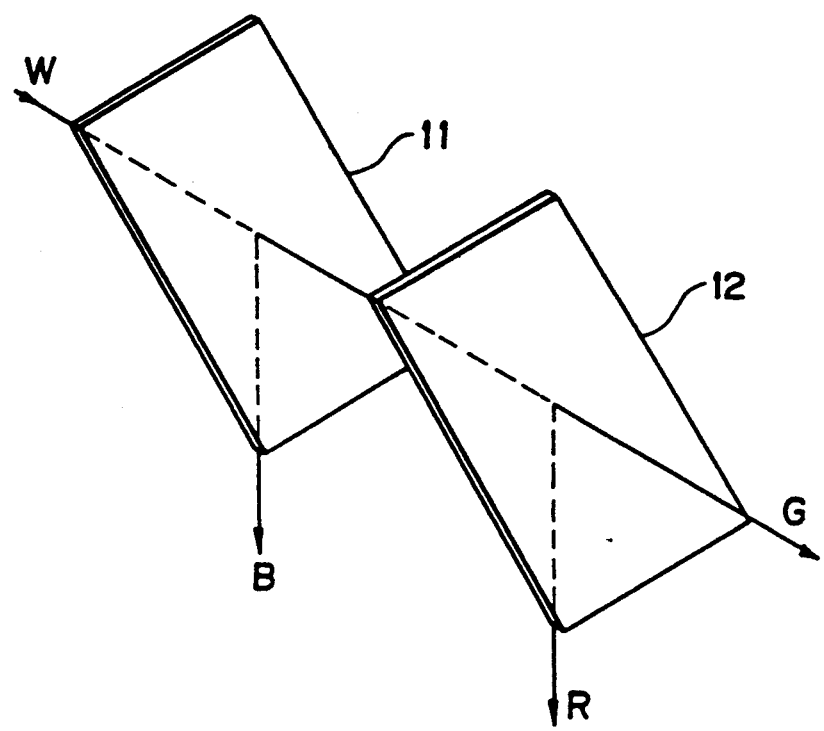
FIG. 2 is a perspective view showing a conventional color separation/optical system.

An embodiment where this invention is applied to a liquid crystal projection television is shown in FIG. 1. In this figure, a white light source 10 for emitting a white light is provided on the incident side of an optical system in the liquid crystal projection television, and two dichroic mirrors 11 and 12 constituting a color separation optical system are provided in front of the white light source 10. These dichroic mirrors 11 and 12 are, as shown in FIGS. 1 and 2, arranged in a manner that they are inclined with respect to the optical axis of a while light W incident from the white light source 10, and are in parallel with each other. The dichroic mirrors 11 and 12 serve to reflect a blue light B and a red light R, respectively, wherein dichroic plane surfaces each comprised of a derivative multi layer film are respectively formed on a glass base plate surface on the side of the white light source 10 of the dichroic mirrors.

The blue light B of the white light W emitted from the white light source 10 is reflected by the dichroic mirror 11, and the remaining red light R and green light G are transmitted through the dichroic mirror 11. Then, the red light R of the transmitted light is reflected by the dichroic mirror 12, so only the green light G is transmitted therethrough. In this way, the white light W is separated into three colors.

When respective rays of light R, G and B are transmitted through liquid crystal cells 15R, 15G and 15B of which light transmittivities vary in dependency upon respective image signals, images of respective colors are formed. Images of respective rays of light are synthesized by two dichroic mirrors 16 and 17 constituting a color synthetic optical system similarly arranged in parallel, and are thereafter projected onto the screen by an image lens 18. Additionally, a mirror 13 is provided on the emitting side of the liquid crystal cell 15G to reflect a green light G emitted from the liquid crystal cell 15G toward the side of the dichroic mirror 17. On the incident side of the liquid crystal cells 15R, 15G and 15B, condenser lenses 14 are respectively arranged, to allow incident respective rays of light R, G and B to be incident substantially vertically on the liquid cells 15R, 15G and 15B.

Figure 3:
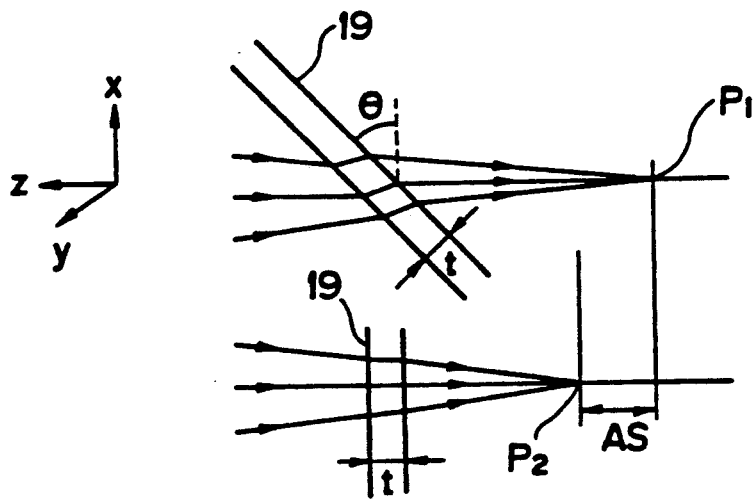
FIG. 3 is an explanatory view for explaining an astigmatism produced when a light is obliquely incident on a conventional plane parallel plate such as a glass, etc..
Figure 4:
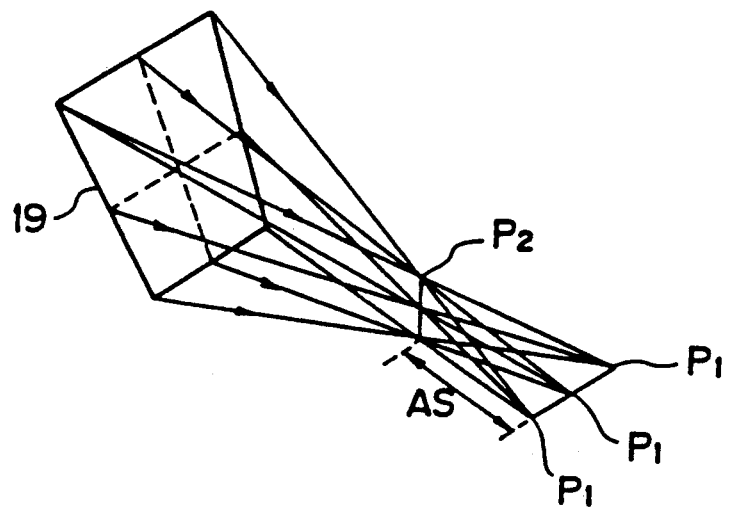
FIG. 4 is an explanatory view for explaining an astigmatism produced when a light is obliquely incident to a conventional plane parallel plate such as a glass, etc..

As stated above, since the dichroic mirrors 11 and 12 are used in a manner inclined to incident rays of light, there occurs astigmatism in a light transmitted through the dichroic mirrors 11 and 12. Namely, as shown in FIGS. 3 and 4, when a light is obliquely incident on a plane parallel plate 19 such as a glass which is disposed inclinedly forward about a horizontal axis y, light beams on a plane (vertical plane) in parallel with a plane including an x-axis and a z-axis are focused at a point $P_1$. Light beams on a plane horizontal plane in parallel with a plane including the z-axis and the y-axis are focused at a point $P_2$. That is, an astigmatic difference As occurs between the light beams on the two planes perpendicular to each other.

In the case of the dichroic mirrors 11 and 12 arranged in parallel as in the prior art, an astigmatism due to the fact that a light is transmitted therethrough would increase every time a light is transmitted through the dichroic mirrors. In the case of FIG. 2, the blue light B is only reflected on the mirror 11 and does not produce the astigmatism. However, the red light R has an astigmatism due to the fact that it is transmitted through the dichroic mirror 11, and the green light G has an astigmatism due to the fact that it is transmitted through the dichroic mirrors 11 and 12. Such an astigmatism appears as a gradation of a projected image.

[I] Principle of an embodiment of this invention

Figure 5:
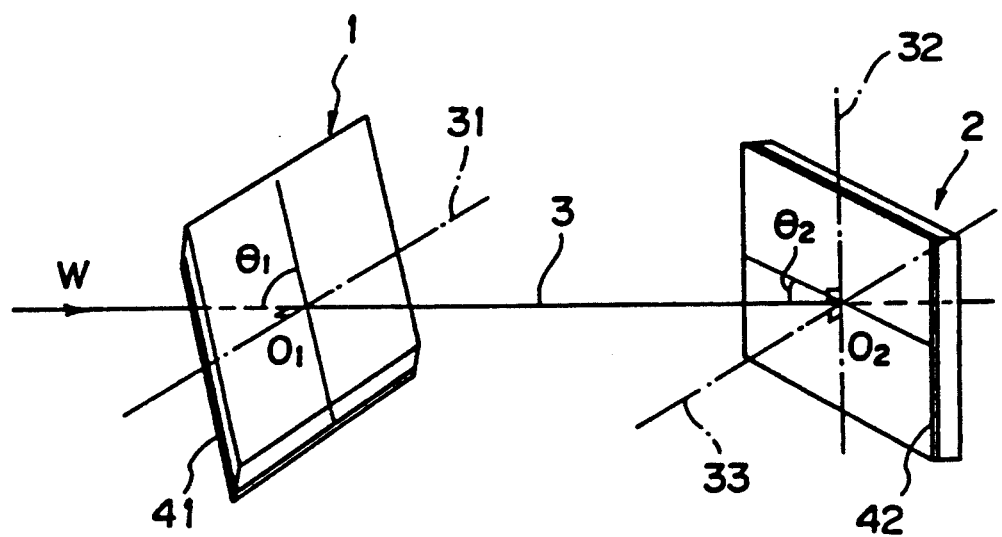
FIG. 5 is an explanatory view showing the principle of a color separation/synthetic optical system of this invention.

The principle of an embodiment of this invention will now be described with reference to FIG. 5. In this figure, a color separation/synthetic optical system according to this embodiment is constructed as follows. First and second dichroic mirrors 1 and 2 for allowing an incident light to be transmitted therethrough and to be reflected thereon every different rays of light are provided in succession on the optical center axis 3 of a transmitted bundle of light with a predetermined spacing ($O_1$–$O_2$) therebetween. Respective dichroic surfaces 41 and 42 of the first and second dichroic mirrors 1 and 2 are arranged on the light incident side of the optical center axis 3. The first dichroic mirror 1 is arranged within a plane including a first horizontal axis 31 vertical to the optical center axis 3 and inclined by a predetermined angle $\theta_1$ with respect to the optical center axis 3. In addition, the second dichroic mirror 2 is arranged within a plane including a second vertical axis 32 vertical to both of the optical center axis 3 and a third horizontal axis 33 passing through a point $O_2$ in parallel to the first axis 31, and inclined by a predetermined angle $\theta_2$ with respect to the optical center axis 3.

When a white light is incident on the first dichroic mirror 1, only anyone of color light of red, green and blue is reflected, and the remaining rays of color light are transmitted. These rays of transmitted light are incident on the second dichroic mirror 2. In this case, one color light of these rays is transmitted through two transparent base plates of the second dichroic mirror 2, and the remaining color light is reflected on the dichroic surface between two transparent base plates within the second dichroic mirror 2.

Since the second dichroic mirror 2 is rotationally inclined about the axis 32 vertical to the axis 31 of rotational inclination of the first dichroic mirror 1, a plane including the optical center axis 3 and the normal of the first dichroic mirror 1 becomes substantially orthogonal to a plane including the optical center axis 3 and the normal of the second dichroic mirror 2. Thus, the astigmatic difference produced in a transmitted light through the first dichroic mirror 1 is compensated for by the second dichroic mirror 2. That is, if the second dichroic mirror 2 is rotated about the vertical axis 32, rays on a horizontal plane are focused at a point further than the point $P_2$ (FIG. 3) to coincide the point with the point $P_1$ thereby to cancel the astigmatic difference AS generated by the dichroic mirror 1.

[II] Detail of the embodiment of this invention

Figure 6:
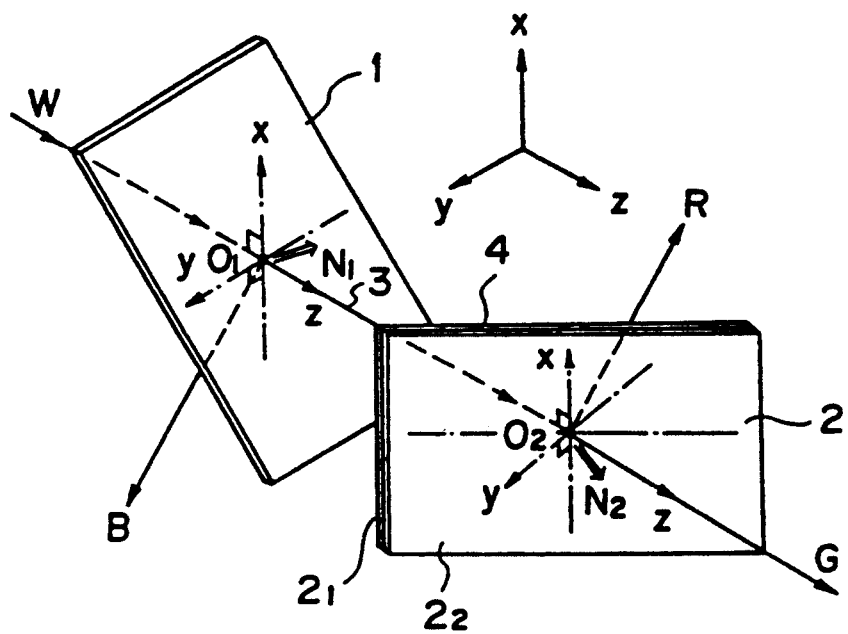
FIG. 6 is a perspective view showing an embodiment of a color separation/synthetic optical system.
Figure 7:
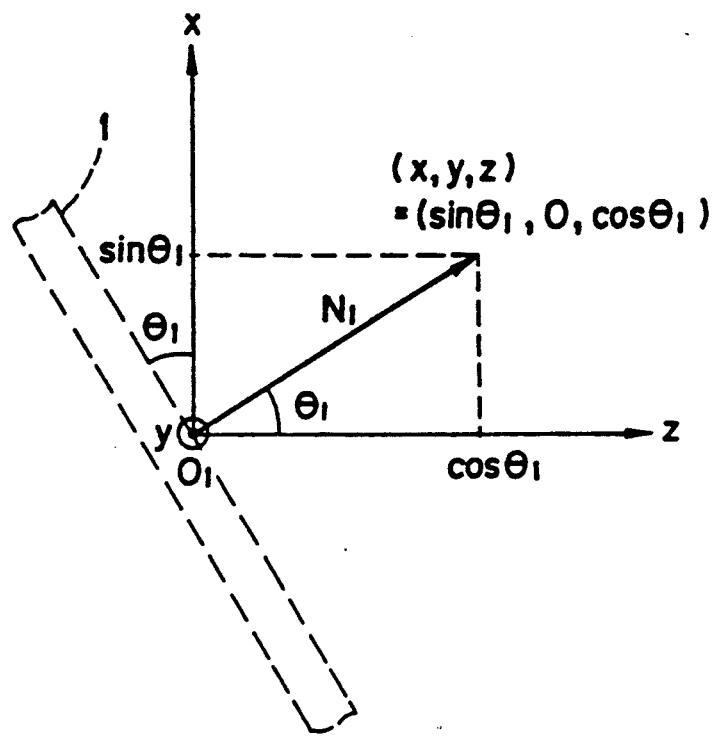
FIG. 7 is a diagram showing an essential part in an enlarged manner when a first dichroic mirror in FIG. 6 is viewed from a y-axis.
Figure 8:
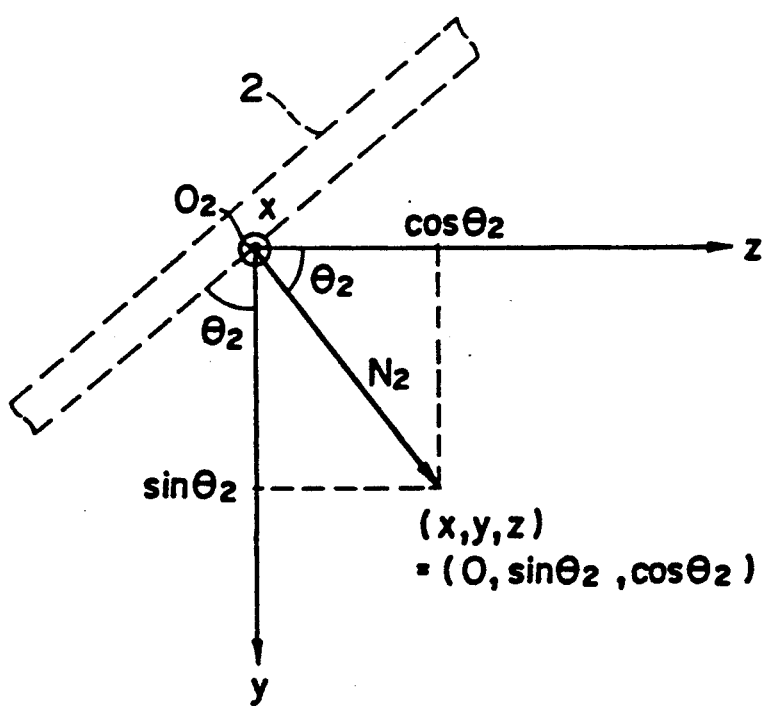
FIG. 8 is a diagram showing an essential part in an enlarged manner when a second dichroic mirror in FIG. 6 is viewed from the x-axis.

The detail of an embodiment of this invention will now be described with reference to FIGS. 6 to 9. The color separation/synthetic optical system according to the detail of the embodiment shown in FIG. 6 is constructed as follows. In an xyz three dimensional coordinate system, first and second dichroic mirrors 1 and 2 are successively arranged on the z-axis in correspondence with the projected direction (optical center axis) of the white light W with a spacing $O_1$–$O_2$ therebetween. The first dichroic mirror 1 is in an inclined state rotated by an angle $\theta_1$ about the y-axis from a plane including the x-axis and the y-axis and passing through the point $O_1$ on the z-axis. Further, the second dichroic mirror 2 is in an inclined state rotated by an angle $\theta_2$ about the x-axis from a plane including the x-axis and the y-axis and passing through the point $O_2$ on the z-axis. Namely, the normal vector N1 of the first dichroic mirror 1 is expressed, as shown in FIG. 7, as $(\sin \theta_1, O, \cos \theta_1)$ in the xyz three dimensional coordinate system, and the normal vector N2 of the second dichroic mirror 2 is expressed, as shown in FIG. 8, as $(O, \sin \theta_2, \cos \theta_2)$ in the xyz three dimensional coordinate system.

Figure 9:
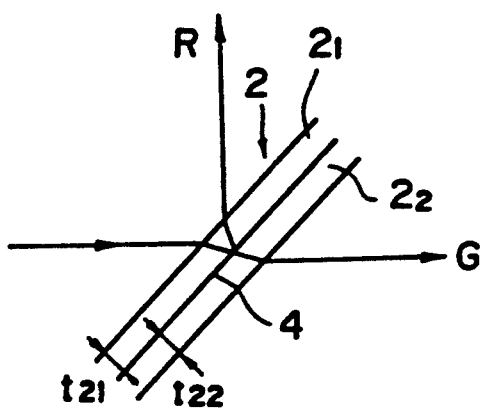
FIG. 9 is a partial cross sectional view of the second dichroic mirror used in the color separation/synthetic optical system.

The second dichroic mirror 2 is, as shown in FIGS. 6 and 9, comprised of two glass base plates 21 and 22 combined. Between glass base plates 21 and 22, a dichroic surface 4 comprised of a derivative multi-layer film is formed. In this actual embodiment, a red light R is reflected on the dichroic surface 4. Further, a dichroic mirror surface is provided in the first dichroic mirror 1 so that a blue light B is reflected thereon.

The operation of the actual embodiment based on the above-mentioned configuration will now be described.

When a white light W is incident from the z-axis direction on the first dichroic mirror 1, a blue light B is reflected, and a red light R and a green light G are transmitted therethrough and are then incident on the second dichroic mirror 2. The red light R of these rays of light is transmitted through the glass base plate 21, and is reflected on the dichroic surface 4. The red light R thus reflected is transmitted through the glass base plate 21 for a second time and is then emitted therefrom.

In addition, the glass light G is transmitted through the glass base plates 21 and 22.

As shown in FIG. 3, when the thickness of a glass flat plate having a refraction index n is t, and the inclined angle is $\theta$, the astigmatic difference is expressed as follows:

$$As = \frac{t(n^2 - 1) \sin^2 \theta}{\sqrt{n^2 - \sin^2 \theta} \times (n^2 - \sin^2 \theta)} \quad (1)$$

The focal point $P_1$ of rays on a vertical plane including the x- and z-axes is positioned further than the focal point $P_2$ of rays on a horizontal plane including the y- and z-axes. However, in this embodiment, since the second dichroic mirror 2 is rotated about the vertical axis 32 corresponding to the x-axis in FIG. 3, the focal point $P_2$ of rays on the horizontal plane in the second dichroic mirror 2 is moved toward the focal point $P_1$ of rays on the vertical plane so that both focal points $P_1$ and $P_2$ are coincided with each other. In this embodiment, the green light G is transmitted through the first dichroic mirror 1 and the glass base plate 21 and 22 of the second dichroic mirror 2, the red light R is transmitted through the first dichroic mirror 1 and through the glass base plate 21 of the second dichroic mirror 2 two times. The first and second dichroic mirrors 1 and 2 are arranged so as to cancel an astigmatic quantity by transmission. Accordingly, by adjusting the inclined angles $\theta_1$ and $\theta_2$ of the first and second dichroic mirrors 1 and 2, the thickness of the glass base plate and the material of the glass base plane, astigmatic differences of the green light G and the red light R can be canceled.

If the thicknesses of the glass plates of the first and second dichroic mirrors 1 and 2 and the materials (n) thereof are equal to each other, the inclined angles $\theta_1$ and $\theta_2$ are equal to each other. Further the first and second dichroic mirrors 1 and 2 may be disposed oppositely. That is, the second dichroic mirror 2 may be disposed forward and the first dichroic mirror 1 may be disposed backward.

[III] Example of actual numeric value

In actual terms, BK-7 (Nd=1.51633) of an optical glass is used as the glass base plate of the first dichroic mirror 1. When the thickness $t_1$ is 2 mm and the inclined angle $\theta_1$ is 42 degrees, the astigmatic difference AS due to a light transmitted through the first dichroic mirror 1 is given as AS=0.46180 in accordance with the above mentioned equation (1).

On the other hand, when the material of the glass base plates 21 and 22 of the second dichroic mirror 2 is BK-7, and the inclined angle $\theta_2$ is 45 degrees, in order to cancel the astigmatic difference AS of the first dichroic mirror 1, the thicknesses $t_{21}$ and $t_{22}$ of the glass base plates 21 and 22 are set as follows.

In this case, the astigmatic difference AS is expressed as AS=0.26917×t. Accordingly, since the red light R is transmitted two times through the glass base plate 21, the following relationship is obtained:

$$0.4618 = 0.26917 \times 2t_{21}.$$

To allow the above mentioned relationship to hold, $t_{21}$ must be equal to 0.85782 (mm). On the other hand, since the green light G is passed through both of the glass base plates 21 and 22, the following relationship is obtained:

$$0.4618 = 0.26917 \times (t_{21} + t_{22}).$$

If $t_{22}$ is 0.85782 (mm), the astigmatic difference can be canceled.

[IV] Other embodiments of this invention

It is to be noted that while it is described in the above mentioned embodiment that the first dichroic mirror 1 is adapted to reflect the blue light B thereon, it is of course that a first dichroic mirror 1 adapted to reflect the red light R or the green light G thereon may be used. In that case, a dichroic surface 4 adapted to reflect thereon any color light different from that reflected on the dichroic surface of the first dichroic mirror 1 may be used.

In addition, while the color separation optical system has been described in the above-mentioned embodiment, e.g., if respective rays of light R, G and B are caused to travel in an opposite direction, the first and second dichroic mirrors 1 and 2 of FIG. 6 constitute a color synthetic optical system.

As is clear from the foregoing description, in accordance with this invention, the first and second dichroic mirrors are arranged in a manner that the normals of their mirror surfaces are substantially orthogonal to each other, and that a light is permitted to be transmitted between the both mirrors, and the dichroic mirror surface of the second dichroic mirror is formed between two transparent base plates, thus permitting astigmatic differences of respective rays of color light produced every time they are transmitted through the first and second dichroic mirrors to be canceled with each other. Accordingly, when the color separation/synthetic optical system of this invention is used for a liquid crystal projection television, or a color television, etc., it is possible to prevent gradation, etc. of an image due to the dichroic mirror.

What is claimed is:

1. A color separation/synthetic optical system in which a plurality of dichroic mirrors for allowing an incident light to be transmitted therethrough or to be reflected thereon every different ray of color light are provided in succession on a center axis of the transmitted bundle of light to separate a white light into respective rays of color light of red, green and blue by the plurality of dichroic mirrors, and to synthesize respective rays of color light of red, green and blue into a predetermined color light, wherein the system has at least two first and second dichroic mirrors which are disposed adjacent to each other, said first dichroic mirror comprising a substrate and a mirror layer disposed on a light incident side of said substrate and being arranged within a plane including a first axis vertical to the optical center axis and inclined by a predetermined angle with respect to the optical center axis, said second dichroic mirror comprising a pair of substrates and a mirror layer interposed between said pair of substrates, the thickness and refraction index of one of said pair of substrates at the light incident side being prescribed to give a light, which is reflected by said second dichroic mirror, an astigmatism to compensate an astigmatism given by said first dichroic mirror, the thicknesses and refraction indexes of said pair of substrates being prescribed to give a light, which is transmitted through said second dichroic mirror, an astigmatism to compensate the astigmatism given by said first dichroic mirror, said second dichroic mirror being arranged within a plane including a second axis vertical to both of the optical center axis and the first axis and inclined by a predetermined angle with respect to the optical center axis.

2. A color separation/synthetic optical system as set forth in claim 1, wherein, in an xyz three dimensional coordinate system, the first axis coincides with a y-axis, the second axis coincides with an x-axis, and the optical center axis coincides with a z-axis, the first dichroic mirror being rotated about the y-axis, the second dichroic mirror being rotated about the x-axis.

3. A color separation/synthetic optical system as set forth in claim 2, wherein both inclined angles of the first and second dichroic mirrors are equal to each other.

4. A color separation/synthetic optical system as set forth in claim 1, wherein the first axis coincides with an x-axis, the second axis coincides with a y-axis, and the optical center axis coincides with a z-axis.

5. A color separation/synthetic optical system as set forth in claim 1, wherein said substrates comprise glass base plates, respectively.

6. A color separation/synthetic optical system as set forth in claim 1, wherein said mirror layer of said second dichroic mirror comprises a derivative multilayer film.

7. A color separation/synthetic optical system as set forth in claim 1, wherein the thicknesses and materials of the substrates of said first and second dichroic mirrors are same to each other, and the inclined angles of said first and second dichroic mirrors are same to each other.

* * * * *